United States Patent [19]

Camberlin et al.

[11] Patent Number: 5,198,516
[45] Date of Patent: Mar. 30, 1993

[54] THERMALLY STABLE BISIMIDO/P-ALLYLANILINE COPOLYMERS

[75] Inventors: Yves Camberlin, Caluire; Rene Dien, Millery; Philippe Michaud, Lyons, all of France

[73] Assignee: Ciba-Geigy Corporation, Ardsley, N.Y.

[21] Appl. No.: 730,537

[22] Filed: Jul. 16, 1991

[30] Foreign Application Priority Data

Jul. 16, 1990 [FR] France .................. 90 09271

[51] Int. Cl.⁵ .............................................. C08F 22/40
[52] U.S. Cl. ................................ 526/262; 525/113
[58] Field of Search .................. 526/262; 525/113

[56] References Cited

U.S. PATENT DOCUMENTS 4,323,662  4/1982  Oba et al. .................. 526/262

FOREIGN PATENT DOCUMENTS 273839   6/1988  France .................. 526/262
2608612  6/1988  France .
284524   9/1988  France .
334771   9/1989  France .

OTHER PUBLICATIONS

Patent Abstracts of Japan vol. 14, No. 176, Apr. 9, 1990 (Sumitimo Bakelite Co Ltd).

*Primary Examiner*—Joseph L. Schofer
*Assistant Examiner*—Alex H. Walker
*Attorney, Agent, or Firm*—JoAnn Villamizar

[57] ABSTRACT

Novel thermally stable bisimido/allylaniline polymers and prepolymers, well adopted for the production of prepregs and reinforced and impregnated composite shaped articles, comprise the copolymerizates of (a) at least one N,N'-bisimide, with (b) at least one hindered p-allylaniline, optionally in the presence of (c) an organic peroxide, azobisisobutyronitrile or an imidazole, (d) a vinylpyridine, N-vinylpyrrolidone, allyl isocyanurate, vinyltetrahydrofuran, or mixture thereof, (e) at least one diprimary diamine, and/or (f) an unhalogenated or chlorinated/brominated epoxy resin or N,N'-alkylenebistetrahalophthalimide, or particular (meth)acrylate or alkenylphenol.

17 Claims, No Drawings

THERMALLY STABLE BISIMIDO/P-ALLYLANILINE COPOLYMERS

BACKGROUND OF THE INVENTION

1. Field of the Invention

The present invention relates to novel thermally stable bisimido/p-allylaniline copolymers and to the preparation of such novel copolymers.

2. Description of the Prior Art

Polymers prepared by reacting an N,N'-bisimide of an unsaturated dicarboxylic acid, such as, for example, an N,N'-bismaleimide, with a diprimary diamine (French Patent No. 1,555,564) are known to this art. The amounts of N,N'-bisimide and diamine are selected such as to provide a ratio: number of moles of bisimide/number of moles of diamine equal to at least 1; furthermore, it is generally preferred that such ratio be lower than 50. Thermally stable resins are produced, which display marked resistance to severe thermal stresses.

In the aforementioned French Patent, it is also indicated that the preparation of these resins may be carried out in bulk, by heating reactants which have been thoroughly mixed beforehand, or in an inert polar diluent such as dimethylformamide, N-methyl-pyrrolidone or dimethylacetamide, it being possible for the latter process to be used, for example, when the application of the polymer makes it necessary to employ a solution thereof.

Finally, it too is indicated that, for many applications, it is advantageous to conduct the polymerization in two steps; in a first stage, a prepolymer is prepared by heating a thorough mixture of the two reactants to a temperature on the order of 100° to 250° C. The prepolymer obtained may be employed in the form of a solution, suspension or powder, or else may also be shaped merely by being cast hot. In a second stage, curing of the prepolymer may be effected by heating it to temperatures on the order of 350°, optionally under pressure.

SUMMARY OF THE INVENTION

A major object of the present invention is the provision of novel imido copolymers comprising the polymerizate of:

(a) at least one N,N'-bisimide of the formula:

$$\begin{array}{c} CH-CO \\ \| \\ Y-C-CO \end{array} N-A-N \begin{array}{c} CO-CH \\ \| \\ CO-C-Y \end{array} \quad (I)$$

in which the symbol Y is H, CH$_3$ or Cl; the symbol A is a divalent radical selected from among cyclohexylene, phenylene, 4-methyl-1,3-phenylene, 2-methyl-1,3-phenylene, 5-methyl-1,3-phenylene, 6-methyl-1,3-phenylene, 2,5-diethyl-3-methyl-1,4-phenylene, and the radicals of the formula:

in which T is a single valence bond or a group of the formulae:

$$-CH_2-, -\overset{CH_3}{\underset{CH_3}{C}}-, -O-, -\overset{O}{\underset{O}{S}}-, H-\overset{|}{C}\underset{}{\diagup}\diagdown, S,$$

$$-O-\diagup\diagdown-SO_2-\diagup\diagdown-O-$$

and X is a hydrogen atom, a methyl, ethyl or isopropyl radical; with (b) at least one p-allylaniline of the formula:

$$\begin{array}{c} R^1 \\ H_2N-\diagup\diagdown-CH_2-\overset{H \text{ or } CH_3}{\underset{}{C}}=CH_2 \\ R^2 \end{array} \quad (II)$$

in which the groups R$^1$ and R$^2$, which may be identical or different, are each a C$_1$-C$_4$ alkyl radical, such as, for example, a methyl, ethyl, propyl, isopropyl or butyl radical.

DETAILED DESCRIPTION OF THE PREFERRED EMBODIMENTS OF THE INVENTION

More particularly according to the present invention, particularly exemplary of the bisimides (I) are:
N,N'-Meta-phenylenebismaleimide,
N,N'-Para-phenylenebismaleimide,
N,N'-4,4'-Diphenylmethanebismaleimide,
N,N'-4,4'-Diphenyl ether bismaleimide,
N,N'-4,4'-Diphenyl sulfone bismaleimide,
N,N'-1,4-Cyclohexylenebismaleimide,
N,N'-4,4'-(1,1-Diphenylcyclohexane)bismaleimide,
N,N'-4,4'-(2,2-Diphenylpropane)bismaleimide,
N,N'-4,4'-Triphenylmethanebismaleimide,
N,N'-2-Methyl-1,3-phenylenebismaleimide,
N,N'-4-Methyl-1,3-phenylenebismaleimide, and
N,N'-5-Methyl-1,3-phenylenebismaleimide.

These bismaleimides can be prepared by the processes described in U.S. Pat. No. 3,018,290 and British Patent No. 1,137,290. According to the present invention, N,N'-4,4'-diphenylmethanebismaleimide is the preferred bisimide, whether used alone or in admixture with N,N,-2-methyl-1,3-phenylenebismaleimide, N,N'-4-methyl-1,3-phenylenebismaleimide, or N,N'-5-methyl-1,3phenylenebismaleimide.

Particularly exemplary of the p-allylanilines of formula (II) are:
4-Allyl-2,6-diethylaniline,
4-Methallyl-2,6-diethylaniline,
4-Allyl-2,6-dimethylaniline,
4-Methallyl-2,6-dimethylaniline,
4-Allyl-2,6-dipropylaniline,
4-Methallyl-2,6-dipropylaniline,
4-Allyl-2-methyl-6-ethylaniline, and
4-Methallyl-2-methyl-6-ethylaniline.

These p-allylanilines of formula (II) can be prepared by the process described in *J. Chem. Soc.*, (C), pages 1780 to 1782 (1967).

The amounts of N,N'-bisimide(s)-(a) and of p-allylaniline (b) are selected such as to provide a ratio: number of moles of (a)/number of moles of $NH_2$ groups that ranges from 20 to 0.1, preferably from 5 to 0.5.

To prepare the polymers according to the present invention, it is possible, optionally, to employ a catalyst (c) or a mixture of catalysts, such as (i) an organic peroxide such as, for example, dicumyl peroxide or lauroyl peroxide, (ii) azobisisobutyronitrile, or (iii) an imidazole compound having the general formula:

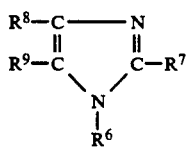

in which each of $R^6$, $R^7$, $R^8$ and $R^9$, which may be identical or different, is a hydrogen atom, an alkyl or alkoxy radical having from 1 to 20 carbon atoms, or a vinyl, phenyl or nitro radical, with the proviso that $R^8$ may form together with $R^9$ and the carbon atoms from which these depend, a single ring member such as, for example, a benzene ring, and with the further proviso that $R^6$ may be a carbonyl group bonded to a second imidazole ring. Particularly exemplary such imidazole compounds include imidazole or glyoxaline, 1-methylimidazole, 2-methylimidazole, 1,2-dimethylimidazole, 1-vinylimidazole, 1-vinyl-2-methylimidazole, benzimidazole and carbonyldiimidazole.

Depending on the nature of the compound (c) employed and on the desired rate of polymerization, the catalyst is employed in a proportion which ranges from 0.01% to 6% by weight, relative to the total weight of the reactants (a) and (b), preferably from 0.1% to 3%.

This catalyst is typically in solution, preferably in cyclohexanone.

The polymers according to the present invention are prepared by adding, advantageously, to the compounds (a) and (b) defined above [optionally with the compound (c)], a compound (d) selected from among vinylpyridines, N-vinylpyrrolidone, allyl isocyanurate, vinyltetrahydrofuran and mixtures thereof.

The amount of compound (d) which is employed represents generally less than 50% and preferably from 1% to 25% of the total weight of the reactant (a) and (b).

This compound (d) is advantageously employed in a solvent such as, for example, cyclohexanone.

The polymers according to the present invention may be prepared by adding to the compounds (a) and (b) defined above, optionally with (c) and/or (c), a compound (e) comprising one or more diprimary diamines selected from among:

(i) the species corresponding to the general formula:

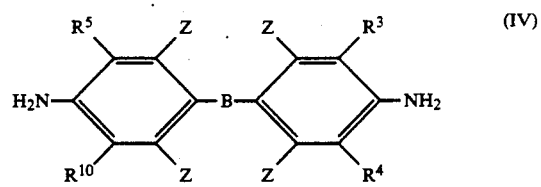

in which each of the symbols $R^5$, $R^{10}$, $R^3$ and $R^4$, which may be identical or different, is a methyl, ethyl, propyl or isopropyl radical; each of the symbols Z, which may be identical or different, is a hydrogen atom or chlorine atom; the symbol B is a divalent radical selected from among the radicals: $CH_2-$,

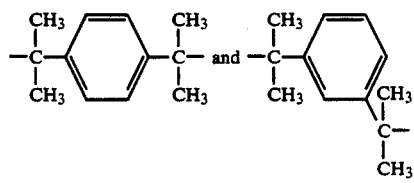

(ii) the species corresponding to the general formula:

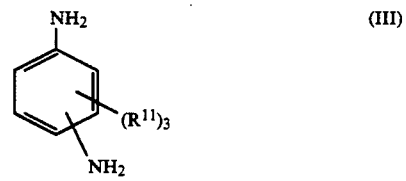

in which the amino radicals are in a meta- or para-position relative to each other, and each of the symbols $R^{11}$, which may be identical or different, is a methyl, ethyl, propyl or isopropyl radical; and (iii) the species comprising one or more substituted guanamine(s) of the formula:

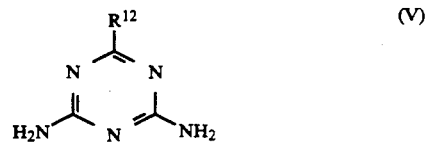

in which the symbol $R^{12}$ is a linear or branched alkyl radical having from 1 to 12 carbon atoms, such as, for example, a methyl, ethyl, propyl, butyl, pentyl, hexyl, heptyl, octyl, nonyl, decyl, undecyl or dodecyl radical, an alkoxy radical having from 1 to 12 carbon atoms, a phenyl radical optionally substituted by 1 to 3 alkyl radicals having from 1 to 3 carbon atoms, a phenylalkyl radical having from 1 to 3 carbon atoms in the alkyl moiety and in which the benzene ring may optionally be substituted by 1 to 3 alkyl radicals having from 1 to 3 carbon atoms.

When the polymers according to the present invention are prepared with one or more of the compounds (e) defined above, the ratio number of moles of (a)/number of moles of $NH^2$ groups as defined above is applicable, but at least 50% of the $NH_2$ groups emanate from the compound (b).

Furthermore, when the compound (iii) is employed, it represents only 2% to 30% and preferably 4% to 15% by weight of the mixture of bisimide(s) (a)+para-allylaniline (b).

Particularly exemplary of the compounds (e) of formula (III) are:
1,3-Diamino-2,4-diethyl-6-methylbenzene,
1,3-Diamino-2-methyl-4,6-diethylbenzene.

Particularly exemplary compounds (e) of formula (IV), are:
4,4'-Diamino-3,3',5,5'-tetramethyldiphenylmethane,
4,4'-Diamino-3,3',5,5'-tetraethyldiphenylmethane,
4,4'-Diamino-3,5-dimethyl-3',5'-diethyldiphenylmethane,
4,4'-Diamino-3,3'-diethyl-5,5'-dimethyldiphenylmethane,
4,4'-Diamino-3,3',5,5'-tetraisopropyldiphenylmethane,
4,4'-Diamino-3,3',5,5'-tetraisopropyldiphenylmethane,
4,4'-Diamino-3,3'-diisopropyl-5,5'-dimethyldiphenylmethane,
1,4-Bis(4-amino-3,5-dimethyl-α,α-dimethylbenzyl)benzene, and
1,3-Bis(4-amino-3,5-dimethyl-α,α-dimethylbenzyl)benzene.

These diamines of formula (IV) can be prepared according to the processes described in British Patent GB-A-852,651 and U.S. Pat. No 3,481,900. 4,4'-Diamino-3,3',5,5'-tetramethyldiphenylmethane, 4,4'-diamino-3,3',5,5'-tetraethyldiphenylmethane, 4,4'-diamino-3,3'-diethyl-5,5'-dimethyldiphenylmethane and mixtures thereof, are preferably employed according to the present invention.

Particularly exemplary compounds (e) of formula (V) are:
2,4-Diamino-6-methyl-1,3,5-triazine,
2,4-Diamino-6-ethyl-1,3,5-triazine,
2,4-Diamino-6-butyl-1,3,5-triazine,
2,4-Diamino-6-nonyl-1,3,5-triazine,
2,4-Diamino-6-undecyl-1,3,5-triazine,
2,4-Diamino-6-methoxy-1,3,5-triazine,
2,4-Diamino-6-butoxy-1,3,5-triazine,
2,4-Diamino-6-phenyl-1,3,5-triazine,
2,4-Diamino-6-benzyl-1,3,5-triazine,
2,4-Diamino-6-(4-methyl)phenyl-1,3,5,-triazine, and mixtures thereof.

The polymers according to the present invention may be prepared by adding to the compounds (a) and (b) [optionally with the compounds (c) and/or (d) and/or (e) a compound (f) or a mixture of compounds (f) selected from among:
(f1) a chlorinated or brominated epoxy resin;
(f2) an N,N'-alkylenebistetrahalophthalimide of the formula:

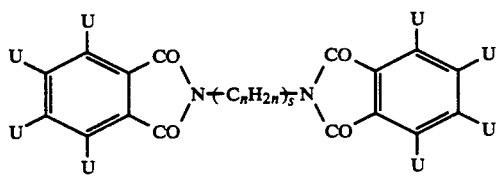

in which each of the symbols U, which may be identical or different, is a chlorine or bromine atom, the alkylene racial —$C_nH_{2n}$— may be linear or branched, n is an integer equal to 1, 2, 3 or 4, and S is 0 or 1;
(f3) a halogenated compound of the formula:

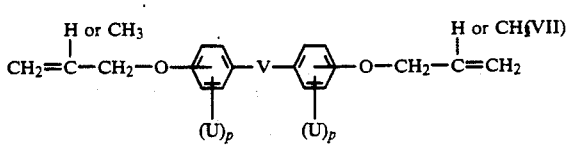

in which the symbols U are as defined above, the symbol V is a single valence bond, a linear or branched alkylene racial —$C_nH_{2n}$—, with n being equal to 1, 2, 3 or 4, or an oxygen atom, and p is an integer equal to 2, 3 or 4;
(f4) an unhalogenated epoxy resin;
(f5) an alkenylphenol of the formula:

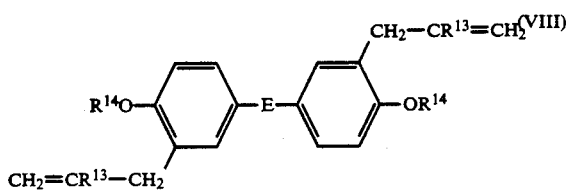

in which the symbol E is a single valence bond or a divalent radical selected from among of the formulae:

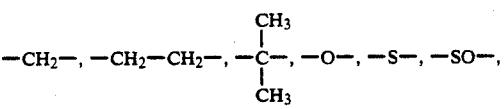

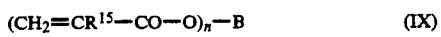

each of the symbols $R^{13}$, which may be identical of different, is a hydrogen atom or a methyl radical and each of the symbols $R^{14}$, which may be identical or different, is a hydrogen atom or a linear or branched alkyl radical having from 1 to 6 carbon atoms, or a phenyl radical; and
(f6) an acrylate of the formula:

$$(CH_2=CR^{15}-CO-O)_n-B \qquad (IX)$$

in which the symbol $R^{15}$ is a hydrogen atom or a methyl radical, n is a whole or fractional number equal to at least 1 and not exceeding 8, the symbol B is an organic radical of valency n, derived from a linear or branched saturated aliphatic residue containing from 1 to 30 carbon atoms and optionally containing one or more oxygen atom bridges and/or one or more free hydroxyl functional groups, or from an aromatic residue (of aryl or arylaliphatic type) having from 6 to 150 carbon atoms, comprising a benzene nucleus which may be substituted by one to three alkyl radicals having from 1 to 5 carbon atoms, or of a plurality of benzene rings optionally substituted as indicated above and bonded together by a single valence bond, an inert moiety or an alkylene radical having from 1 to 3 carbon atoms, with the proviso that such aromatic residue may include in its structure one or more oxygen bridges and/or one or more free hydroxyl functional groups, also with the proviso that the free valencies of the aromatic radical B may be borne by a carbon atom of an aliphatic chain and/or by a carbon atom of a benzene nucleus.

When a compound (f) (or a mixture of compounds (f)) is used to prepare the polymers according to the present invention, it constitutes from 2% to 35%, preferably 5% to 30%, by weight of the mixture of (a)+(b)+optionally (c)+optionally (d)+optionally (e).

It has been determined that the amount of chlorine or bromine which may be introduced into the polymers according to the invention by the additive (f1) and/or (f2) and/or (f3) is liable to affect certain properties of the final product cured polymers, especially those properties relating to thermal stability and those relating to the adhesiveness of the polymers to metals such as, for example, copper. In this respect, the best results are obtained when such amount of chlorine or bromine introduced by the additive (f) and expressed as the weight percentage of elemental chlorine or of elemental bromine relative to the weight of the overall mixture of bisimide(s) (a)+diamine(s) (b)+optional compound (d)+optional compound (e) represents not more than 8%; this amount of chlorine or bromine preferably ranges from 1% to 6%. The amount of chlorine or bromine can be easily adjusted to the desired value by incorporating, for example, epoxy resins (1) which have a higher or lower chlorine or bromine content or by using starting mixtures of chlorinated or brominated epoxy resins (f1) with unhalogenated epoxy resins (f4) or else by using starting mixtures of compounds (f2) and/or (f3) with unhalogenated epoxy resins (f4).

By "chlorinated or brominated epoxy resin (f1)" is intended an epoxy resin having an epoxy equivalent weight ranging from 200 to 2,000 and which comprises a glycidyl ether prepared by reacting epichlorohydrin with a derivative which is chlorinated or brominated on the aromatic nucleus (or nuclei) and emanating from a polyphenol selected from among bis(hydroxyphenyl)alkanes such as 2,2-bis(4-hydroxyphenyl)propane, bis(4-hydroxyphenyl)-methane, bis(4-hydroxyphenyl)methylphenylmethane, bis(4-hydroxyphenyl)tolylmethanes, resorcinol, hydroquinone, pyrocatechol, 4,4'-dihydroxydiphenyl and products of condensation of the aforementioned phenols with an aldehyde.

By the expression "epoxy equivalent weight" is intended the weight of resin (in grams) containing one

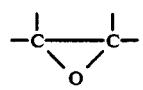

functional group.

A chlorinated or brominated epoxy resin which has an epoxy equivalent weight ranging from 250 to 500 is preferably selected. An epoxy resin (f1) comprising a resin belonging to the class of the glycidyl ethers of bis(hydroxyphenyl)alkanes brominated on the aromatic nuclei, described above in connection with the detailed definition of the resin (e1), is very preferably employed according to the present invention.

As regards the compound (f2) of formula (VI), an N,N'-alkylenebistetrabromophthalimide is preferably selected. N,N'-Ethylenebistetrabromophthalimide is very preferably employed according to the present invention.

As regards the compound (f3) of formula (VII), a bis(allyloxydibromophenyl)alkane is preferably selected, having the formula:

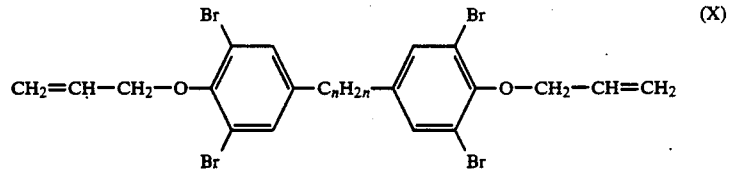

in which n is an integer equal to 1, 2 or 3. 2,2-Bis(4-allyloxy-3,5-dibromophenyl)propane is very preferably employed according to the present invention.

By "unhalogenated epoxy resin (f4)" is intended an epoxy resin which has an epoxy equivalent weight ranging from 100 to 1,000 a:d which comprises a glycidyl ether prepared by reacting epichlorohydrin with a polyphenol which is unchlorinated or unbrominated on the aromatic nucleus (nuclei), selected from among the phenols described above in connection with the definition of the resin (f1).

An unhalogenated epoxy resin which has an epoxy equivalent weight ranging from 150 to 300 is preferably selected. Very preferably, an epoxy resin (f4) is used comprising a resin belonging to the class of glycidyl ethers of bis(hydroxyphenyl)alkanes which are unhalogenated on the aromatic nuclei and which were discussed above in connection with the detailed definition of the resin (f1).

Particularly exemplary alkenylphenols (f5) of formula (VIII) are :
4,4'-Dihydroxy-3,3'-diallylbisphenyl,
Bis(4-hydroxy-3-allylphenyl)methane,
Bis(4-hydroxy-3-allylphenyl)ether,
2,2-Bis(4-hydroxy-3-allylphenyl)propane or
0,0'-Diallylbisphenol A, and the methyl ether corresponding to any one of the aforementioned alkenylphenols.

As is well known to this art, alkenylphenols are prepared by thermal (Claisen) rearrangement of phenol allyl ethers where said allyl ethers are obtained in known manner by reacting, for example, phenols and allyl chloride in the presence of an alkali metal hydroxide and of solvents.

Suitable acrylate reactants (f6) include:
(1) the mono(meth)arcylates having the formula (IX) in which:
b=1, and
B is a monovalent organic radical of the formula:

in which $B_1$ is a linear or branched alkyl radical having from 1 to 6 carbon atoms, or a phenyl radical, and m is an integer equal to zero, 1, 2, 3, 4 or 5;
(2) the di(meth)acrylates having the formula (IX) in which:
n=2, and
B is a divalent organic radical of the formula:

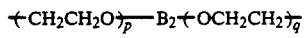 (XIII)

in which B₂ is a linear or branched divalent alkylene radical having from 2 to 9 carbon atoms and optionally comprising one or more oxygen bridges, or a radical of the formula:

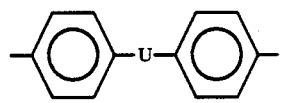

in which the symbol U is a single valence bond or a group:

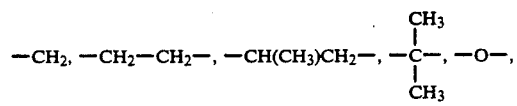

in which each of the symbols p and g, which may be identical or different, is an integer equal to zero, 1, 2, 3, 4 or 5;

(3) the tri- and tetra(meth)arcylates having the formula (IX), in which:
n=3 or 4, and
B is a trivalent or tetravalent organic radical derived from a linear or branched saturated aliphatic residue having from 3 to 20 carbon atoms and optionally comprising one or more oxygen bridges and/or one or more free hydroxyl functional groups;

(4) novolak epoxy (meth)acrylates which, while corresponding to the formula (IX), are here represented by the following formula:

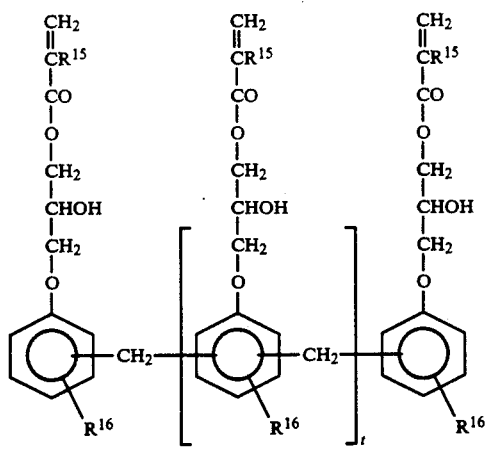 (XIV)

in which the symbol $R^{15}$ is as defined above in connection with the formula (IX), the symbol $R^{16}$ is a hydrogen atom or a methyl radical, t is a whole or fractional number ranging from 0.1 to 7; and (5) mixtures of a plurality of acrylates and/or methacrylates of the same type [(1), (2), (3) or (4)] with each other or mixtures of one or more acrylates and/or methacrylates of the same type with one or more acrylates and/or methacrylates of another type.

Particularly exemplary acrylate reactants (1) include the methyl mono(meth)acrylates, (monoethoxylated) phenol mono(meth)acrylates and (diethoxylated) phenol mono(meth)acrylates.

Particularly exemplary acrylate reactants (2) include ethylene glycol di(meth)acrylates, 1,4-butanediol di(meth)acrylates, 1,6-hexanediol di(meth)acrylates, tripropylene glycol di(meth)acrylates, and di(meth)-acrylates of the following diphenols, di(mono- or polyethoxylated) or otherwise: 4,4'-dihydroxydiphenylmethane, bisphenol A, 4,4'-dihydroxydiphenyl ether and in particular di(monoethoxylated) bisphenol A di(meth)acrylates or di(diethoxylated) bisphenol A di(meth)acrylates [cf. formula (XIII) in which B₂ is the radical:

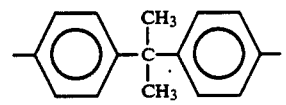

and p=q=1 or 2].

Particularly exemplary acrylate reactants (3) include 1,2,4-butanetriol tri(meth)acrylates, 1,2,6-hexanetriol tri(meth)acrylates, trimethylolpropane tri(meth)acrylates, pentaerythritol tri(meth)acrylates, and pentaerythritol tetra(meth)acrylates.

The novolak epoxy (meth)acrylates (4) are known polymers, certain of which are available commercially. They can be prepared by reacting (meth)acrylic acids with an epoxy resin of the novolak type, the latter being the product of reaction of epichlorohydrin with phenol/formaldehyde polycondensates [in the formula (XIV) given above $R^{16}$ is then a hydrogen atom] or cresol/formaldehyde polycondensates [$R^{16}$ in the formula is then a methyl radical]. These oligomeric polyacrylates (4) and a process for the preparation thereof are described, for example, in U.S. Pat. No. 3,535,403.

Particularly exemplary acrylate reactants (e4) include the novolak epoxy acrylates of formula (XIV) in which $R^{15}$ and $R^{16}$ are each a hydrogen atom, and t is a whole or fractional number ranging from 0.1 to 5.

Particularly exemplary acrylate reactants (5) include mixtures of novolak epoxy (meth)acrylates (4) with not more than 30% by weight, relative to the weight of the mixture of (4)+(3), of a triacrylate and/or a trimethyacrylate as defined above in connection with the acrylate reactant (3) and, in particular, suitable mixtures of novolak epoxy acrylates, described immediately above, with not more than 25% by weight, relative to the weight of the mixture of suitable triacrylate and/or trimethyacrylate selected from among those described above.

The acrylate reactant (f6) is preferably selected from among di(monoethoxylated)bisphenol A di(meth)acrylates, di(diethoxylated)bisphenol A di (meth)acrylates, novolak epoxy acrylates of the formula (XIV) in which $R^{15}$ and $R^{16}$ are each a hydrogen atom and t is a whole or fractional number ranging from 0.1 to 5, such compounds either being employed alone or in admixture with not more than 25% by weight, relative to the weight of the mixture, of trimethylolpropane triacrylate.

The polymers according to the present invention may be prepared by adding to the compounds (a) and (b) [optionally with the compounds (c) and/or (d) and/or (f)] at least one compound (g) comprising an N,N'-bismaleimide including a diorganosiloxane group in its structure.

The reactant (g) is an N,N'-bismaleimide including a diorganopolysiloxane group and essentially corresponds to the general formula:

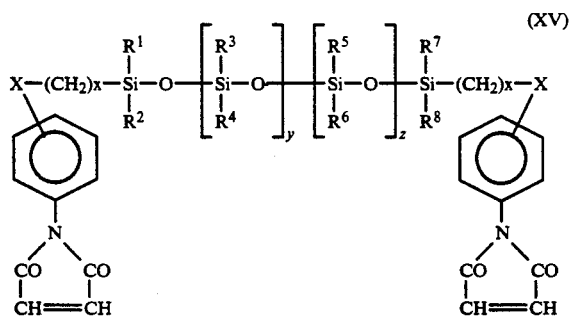
(XV)

in which X, which is in the ortho-, meta- or para-position relative to the carbon atom of the benzene ring which is bonded to nitrogen, is a single valence bond or an atom or group having one of the following formulae:

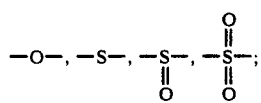

each of $R^1$, $R^2$, $R^3$, $R^4$, $R^5$, $R^6$, $R^7$ and $R^8$, which may be identical or different, is a monovalent hydrocarbon radical selected from among linear or branched alkyl radicals having from 1 to 12 carbon atoms, or a substituted such radical bearing one or more chlorine, bromine or fluorine atom or —CN group substituents, or a phenyl radical optionally substituted by one or more alkyl and/or alkoxy radicals having from 1 to 4 carbon atoms or by one or more chlorine atoms; the symbol x is an integer ranging from 2 to 8; and the symbols y and z denote identical or different, whole or fractional numbers whose sum ranges from 0 to 100.

In the siloxane bismaleimides (g) of formula (XV), when y and/or z are greater than 1, a compound of polymeric structure exists that is rarely a single compound, but in most cases a mixture of the same chemical structure, which differ in the number of recurring units in their molecule; this results in an average value of y and/or z, which may be a whole or fractional number.

Exemplary siloxane bismaleimides (g) are those having the formula (XV), in which:

(1) $X=$—O—; $R^1=R^2=R^3=R^4=R^5=R^6=R^7=R^8=$linear alkyl radical having from 1 to 3 carbon atoms; $x=2$, 3 or 4; y+z ranges from 0 to 100 and preferably from 4 to 70;

(2) $X=$—O—; $R^1=R^2=R^3=R^4=R^7=R^8=$linear alkyl radical having from 1 to 3 carbon atoms; $R^3=R^4=R^5=R^6=$phenyl radical; $x=2$, 3 or 4: y+z ranges from 0 to 100 and preferably from 4 to 70:

(3) $X=$—O—; $R^1=R^2=R^7=R^8=$linear alkyl radical having from 1 to 3 carbon atoms; $R^3=R^4=R^5=R^6=$phenyl radical; $x=2$, 3, or 4; y+z ranges from 0 to 100 and preferably from 4 to 70;

(4) $X=$—O—; $R^1=R^2=R^3=R^5=R^7=R^8=$linear alkyl radical having from 1 to 3 carbon atoms; $R^4=R^6=$phenyl radical; $x=2$, 3 or 4; y+z ranges from 0 to 100 and preferably from 4 to 70; and (5) $X=$—O—; $R^1=R^3=R^5=R^7=$linear alkyl radical having from 1 to 3 carbon atoms; $R^2=R^4=R^6=R^8=$phenyl radical; $x=2$, 3 or 4; y+z range from 0 to 100 preferably from 4 to 70.

Particularly exemplary siloxane bismaleimides (g) are those having the formulae:

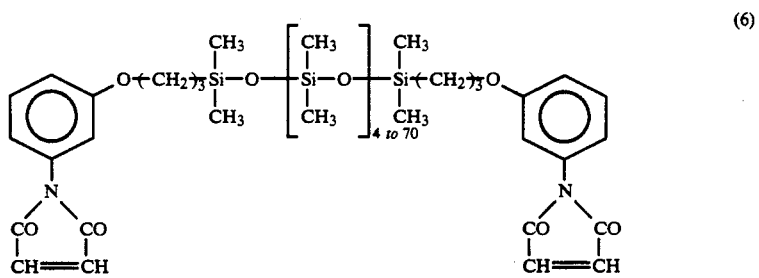
(6)

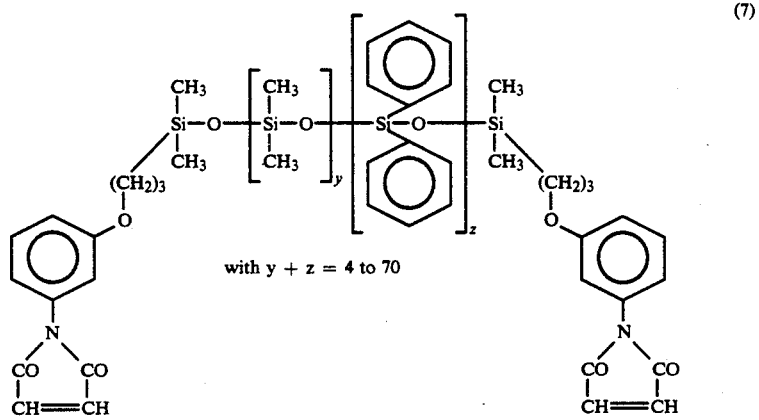
(7)

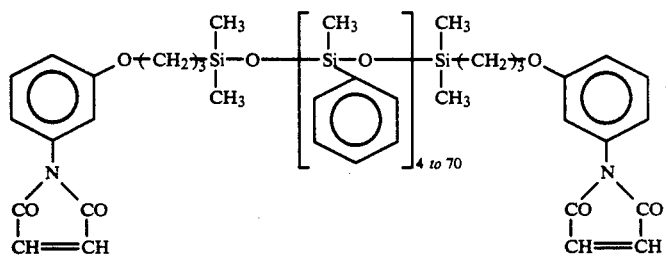

(8)

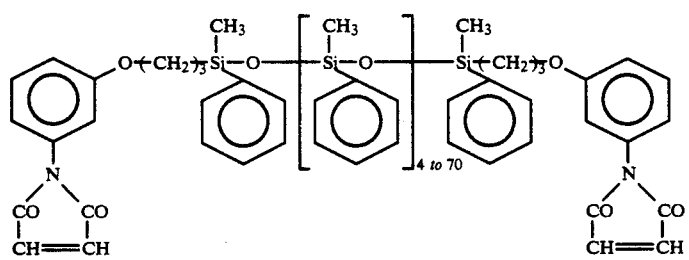

(9)

The siloxane bismaleimides of formula (XV) are compounds which are prepared by reacting maleic anhydride, in the presence of a dehydrating agent, a tertiary amine, an organic diluent and catalyst, with a diamine containing a diorganopolysiloxane group, having the formula:

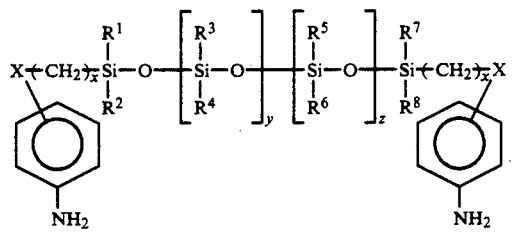

in which X, $R^1$, $R^2$, $R_3$, $R^4$, $R^5$, $R^6$, $R^7$, $R^8$, x, y, and z are as defined above in respect of the formula (XV). For a more detailed description of such siloxanes bismaleimides and the preparation thereof, see published French Patent Application FR-A-2,611,728.

The amount of reactant (g) of formula (XV) introduced for the preparation of the polymers according to the present invention ranges from 0% to 40%, preferably from 5% to 30%, of the total weight of the reactants (a)+(b)+optionally (c)+optionally (d)+optionally (e)+optionally (f).

The polymers according to the present invention do not exhibit any appreciable softening below the temperature at which they begin to degrade. They are insoluble in solvents selected from among aromatic hydrocarbons such as xylene: and toluene, halogenated hydrocarbons such as chlorobenzenes, polar solvents such as dioxane, tetrahydrofuran and dibutyl ether, dimethylformamide, dimethyl sulfoxide, N-methylpyrrolidone and dimethylacetamide.

However, prior to producing the polymers according to the present invention, "prepolymer" products are produced, and these can be isolated, crystallized and ground, such prepolymers being soluble in the polar organic solvents described above. These prepolymers exhibit a softening point at a temperature which is lower than 200° C. (generally this softening point ranges from 50° and to 150° C.). To prepare these prepolymers, the compounds (a)+(b)+optionally (c) and/or (d) and/or (f) and/or (g) are intimately contacted, with stirring, optionally in the presence of solvent(s) in a reactor at temperatures ranging from 50° to 180° C., preferably from 80° to 170° C.

Thus, the polymers according to the present invention may be prepared in the molten state, in bulk, by heating the mixture of compounds until a product is obtained which is homogeneous or doughy at the temperature indicated above, for a period of time which may range from a few minutes to a few hours, this time period being proportionately shorter the higher the temperature which is selected. The viscosity of such prepolymers obtained in the molten state can be easily adjusted to the desired value which ranges, for example, from 0.1 to 50 Pa.s, by modifying, especially, the nature and the corresponding proportions of the compounds used, and the temperature and the length of time of the stages during which the compounds are introduced into the reactor.

The prepolymers according to the present invention may also be prepared in the presence of solvents such as, for example, dimethylacetamide N-methylpyrrolidone, dimethylformamide and cyclohexanone.

Arter neating at a temperature ranging from 180° to 300° C., these prepolymers produce the polymers according to the present invention.

Various adjuvants may be incorporated in the prepolymers according to the invention. These adjuvants, commonly employed and well known to this art, may be, for example, stabilizers or degradation inhibitors, lubricants or mold release agents, colorants or pigments, and powdered or particulate fillers such as silicates, carbonates, kaolin, chalk, powdered quartz, mica or ballotini. It is also possible to incorporate adjuvants which modify the physical structure of the final product, such as, for example, blowing agents or fibrous reinforcing agents such as, especially, carbon, polyimide or aromatic polyamide fibrils or whiskers.

In the homogeneous liquid state the prepolymers according to the invention can be employed directly, for example for impregnating conductors or for producing moldings merely by hot casting. It is also possible, after cooling and grinding, to employ these prepolymers in powder form, for example to produce compression-molded shaped articles, optionally in combination with fibrous or powdered fillers. The prepolymers can also be employed in solution to prepare coatings, adhesive bondings, laminated materials whose backbone can be in the form of woven or nonwoven sheets, of unidirectional components or of natural or synthetic staple fibers, such as, for example, filaments, or fibers of glass, boron, carbon, tungsten, silicon, polyamideimide or aromatic polyamide.

In the form of suspensions or solutions in particular, these prepolymers (P) can be employed for producing coatings and preimpregnated intermediate articles whose reinforcement may include fibrous substances based on aluminum or zirconium silicate or oxide, carbon, graphite, boron, asbestos or glass. These prepolymers (P) may also be employed for producing cellular materials after inrorporation of a blowing agent such as, for example, azodicarbonamide.

The prepolymers according to the present invention are useful for producing solvent-free preimpregnated intermediate shaped articles. The impregnation of the fibrous materials may be performed by the application of conventional techniques such as dip-, doctor blade- or curtain-coating or impregnation by transfer. The transferable film and the preimpregnated articles can be directly used or else can be stored for subsequent usage. They retain their properties remarkably during cold storage at a temperature of from 0° to 10° C. The prepolymers employed for this application preferably have a melt viscosity ranging from 2 Pa.s to 50 Pa.s.

The preimpregnated materials can be employed for the production of components of various shapes and for various purposes in many industries such as, for example, in aeronautics. These components, which may be articles of revolution, are produced by coating a former or a support with a number of layers of prepregs.

Crosslinking is then carried out under the usual technological conditions applicable to composite materials, and in particular at temperatures ranging from 180° to 300° C.

The prepregs can also be used as reinforcements or as means for repairing damaged components.

However, it is also possible to devise components according to the filament winding technique with or without a support, which is intended for the production of articles of revolution, a technique which is employed, especially, for fabricating components which are applicable to the motor vehicle and aeronautics industries. The prepolymers used in this technique preferably have a melt viscosity ranging from 0.1 Pa.s to 2 Pa.s.

In a second stage, the prepolymers may be cured by heating up to temperatures on the order of 300° C., generally ranging from 180° to 250° C. The prepolymers according to the present invention are then obtained, which may be affixed to a support. Additional forming may be carried out during the curing, optionally under vacuum or under superatmospheric pressure, it also being possible for these operations to be conclusive. The curing may be carried out in the presence of a radical polymerization initiator such as lauroyl peroxide, azobisisobutyronitrile or an anionic polymerization initiator such as diazabicyclooctane.

The polymers according to the invention are of interest for such industrial applications which require materials having good mechanical and electrical properties, as well as high chemical inertness at temperatures of from 200° to 300° C. They can thus be employed, especially, in electronics. For example, they ar suitable for the manufacture of sheet or tubular insulators for electrical transformers, printed circuit substrates, pinions, rings, and the like. These prepolymers are more particularly suitable for application by injection into compact reinforcements comprised of inorganic or organic fibers which are plaited in a number of directions. This technique requires very lengthy injection times, in respect of the compactness of the reinforcements, and therefore requires a polymeric substance which is fluid in order to ensure good penetration into the reinforcement and which has a low viscosity which must exhibit little change over time at the temperature which is selected to carry out the injection (for example, on the order of 70° to 110° C.).

In order to further illustrate the present invention and the advantages thereof, the following specific examples are given, it being understood that same are intended only as illustrative and in nowise limitative.

EXAMPLE 1

An apparatus was employed which included a 100-cm$^3$ glass reactor fitted with a central stirrer and a side tube enabling the reactants to be charged. The reactor containing:

(i) 11.4 g of 4-allyl-2, 6-diethylaniline,
(ii) 2.7 g of cyclohexanone, and
(iii) 2.7 g of N-vinylpyrrolidone was placed in an oil bath heated to 155° C. After 30 seconds of heating, 43.2 g of N,N'-4,4'-diphenylmethanebismaleimide were charged with stirring over 6 minutes and 30 seconds. At the end of 6 minutes, the reaction mass was liquid. The reaction was continued for an additional 9 minutes at 150° C. The resin obtained was cast onto a metal plate at room temperature. After solidifying, it was ground.

44 g of this ground resin were dissolved, in a 250-cm$^3$ beaker, in a mixture of 27 g of dimethylformamide and 9 g of N-methylpyrrolidone. One hour of stirring at room temperature sufficed to provide a homogeneous collodion having a viscosity of 240 mPa.s at 25° C.

An aminosilane-treated 200 g/m$^2$ glass fabric, ref. 7628, marketed by Porcher, was coated with the collodion described above. The deposit was 25.6 g in the case of a 33×32 cm rectangle. The coated fabric, stretched on a frame, was placed for 7 minutes in a ventilated oven thermostated at 150° C. to remove the solvent. A preimpregnated fabric designated a "prepreg" was thus produced.

A copper-containing laminate was manufactured from 6 plies of prepregs and 2 sheets of copper which were treated on one face surface, of Yates trademark (Ref. NT-TWS). The assembly was placed under 40 bars, 15 minutes at 150° C. and then 1 hour, 15 minutes, at 180° C. It was after-baked at 200° C. for 16 hours. A laminate or "clad" was produced.

Adhesion of the copper to the laminate was measured in a tensometer; the peel strength was 2 kg/cm. After the clad had been maintained at 288° C. for 5 minutes, this value was 1.5 kg/cm.

EXAMPLE 2

An apparatus was employed including a 200-cm$^3$ glass reactor fitted with a central stirrer and a side tube permitting reactants to be charged or degassing. This tube was connected to a vacuum pump via traps cooled with a mixture of acetone and solid $CO_2$.

The reactor contained:

(i) 55.04 g of 4-allyl-2,6-diethylaniline,
(ii) 0.80 g of cyclohexanone, and
(iii) 0.16 of imidazole and was placed in an oil bath heated to 150° C. After one minute of heating, 104 g of N,N'-diphenylmethanebismaleimide were charged with stirring over 5 minutes. At the end of 2 minutes, the reaction mass was clear. The reaction was continued for 3½ minutes at atmospheric pressure and 3½ minutes at a reduced pressure of 1,330 Pa. The resin obtained was cast into molds preheated to 150° C., including two rectangular chromed plates separated by a 4-mm gap.

The crosslinking of the resin in the mold was carried out at atmospheric pressure in an oven heated according to the following heat cycle:
(a) maintained at 150° C. for 1 hour,
(b) increase from 150° to 200° C. over 50 minutes,
(c) maintained at 200° C. for 2 hours,
(d) increase from 200° to 250° C. over 50 minutes,
(e) maintained at 250° C. for 16 hours,
(f) increase from 250° to 300° C. over 20 minutes,
(g) maintained at 300° C. for 2 hours,
(h) cooling to room temperature over 2 hours.

After demolding, test specimens were cut for determining:
(1) flexural properties, according to ASTM standard D-790,
A tensile strength (Sf) of 123 MPa and a modulus (Mf) of 3.2 GPa were determined;
(2) resilience properties, according to ASTM standard E 399.

The following were determined:
$K_{IC} = 0.450$ MPA $\sqrt{m}$
$G_{IC} = 57$ J/m$^2$.

The measurement of expansion as a function of temperature enabled the glass transition point (Tg) to be determined at 221° C.

EXAMPLE 3

The apparatus described in Example 2 was employed. The reactor containing 23.19 g of 4-allyl-2, 6-diethylaniline was placed into an oil bath heated to 150° C. After one minute of heating, 44.33 g of N,N'-4,4'-diphenylmethanebismaleimide were introduced over 4 minutes. Reaction was permitted to take place for 5 minutes. The reaction mass was degassed under reduced pressure (2,660 Pa) for 2 minutes. A solution of 0.4 g of cyclohexanone + 0.08 g of imidazole was then introduced. Reaction was permitted to occur for 2 minutes and 12 g of N,N'-bismaleimide containing a diorganopolysiloxane group, preheated to 80° C., were introduced over 3 minutes, its formula being:

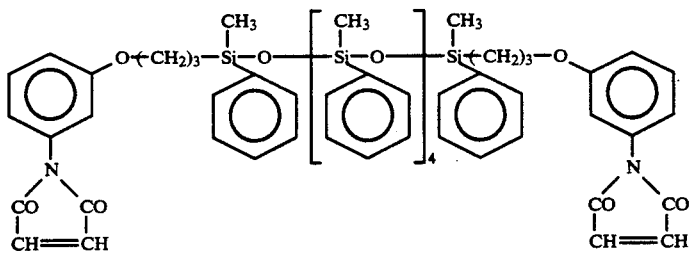

this compound being prepared according to Example 4 of FR-A-2,611,728.

The reaction mass was degassed again for 2 minutes under reduced pressure (2,660 Pa).

The resin obtained was cast into a mold at 150° C. and crosslinked according to the heat cycle described in Example 2.

Resilience measurement: $K_{1C} + 0.590$ MPa $\sqrt{m}$
$G_{C1C} = 154$ J/m$^2$
Transition point: 206° C.

EXAMPLE 4

16.7 g of 4-allyl-2,6-dielthylaniline were charged into a 100-ml glass reactor fitted with a stainless steel anchor stirrer and with a side tube permitting volatile products to escape. The reactor was placed in a bath at 160° C. After 30 seconds, 63.3 g of N,N'-diphenylmethanebismaleimide were charged with stirring. The reaction was permitted to proceed for 6½ minutes. The reaction mass was clear 6 minutes after the end of addition. The reaction was permitted to proceed for another 7 minutes, the final five at an absolute pressure of 1,330 Pa to degas. The resin was cast into a parallelepipedal 140×100×4 mm mold preheated to 150° C. The baking cycle was the same as that according to Example 2.

The following were determined for the polymer obtained by operating according to ASTM standard D 790:
(1) at 250° C., Sf=151 MPa, Mf=3.77 GPa,
(2) at 200° C., Sf=102 MPa, Mf=2.64 GPa,
(3) at 250° C., Sf=102 MPa, Mf=2.58 GPa The following were determined in the case of resilience, determined according to ASTM standard E 399:
$K_{IC} = 0.500$ MPa $\sqrt{m}$,
$G_{IC} = 78$ J/m$^2$.

According to the TMA measurement, the Tg was 263° C.

An additional cure of 2 hours at 300° C. enabled the Tg to be increased to 312° C.

EXAMPLE 5

16.56 g of 4-allyl-2,6-diethylaniline and a solution containing 0.5 g of cyclohexanone and 0.1 g of imidazole were charged into the same apparatus as that described in Example 4. The reactor was placed in a bath at 150° C. After one minute of stirring, the following mixture was added, in powder form, over 4 minutes:
(i) 66.27 g of N,N'-4,4'-diphenylmethanebismaleimide, and
(ii) 16.56 g of 4,4'-methylenebis(2,6-diethylamine).

The reaction mass was clear after 8 minutes. It was degassed for 3 minutes at an absolute pressure of 3,300 Pa. A portion of the resin obtained was cast into a mold at 150° C. and subjected to the cure cycle according to Example 2, up to 16 hours at 250° C., followed by cooling to room temperature over 2 hours. The other portion was cooled; at 80° C., its viscosity was 7.65 mPa.s. It was still clear and very tacky at room temperature.

The flexural strength and modulus of the polymer obtained were measured after it had been cast into a mold and subjected to the curing cycle:

(1) at 25° C. : Sf=108 MPa, Mf=3.48 GPa
(2) at 200° C. : Sf=44 MPa, Mf=1.23 GPa.

According to TMA measurement, the Tg was 215° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A bisimido/allylaniline polymer comprising the copolymerizate of:

(a) at least one N,N'-bisimide having the formula:

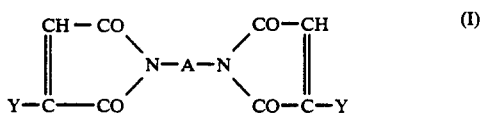

in which the symbol Y is H, CH$_3$ or Cl; the symbol A is a cyclohexylene, phenylene, 4-methyl-1,3-phenylene, 2-methyl-1,3-phenylene, 5-methyl-1,3-phenylene, 6-methyl-1,3-phenylene, 2,5-diethyl-3-methyl-1,4-phenylene, or a radical of the formula:

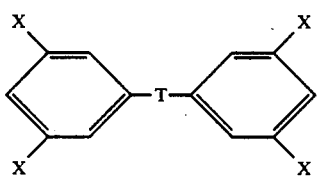

in which T is a single valence bond or a group:

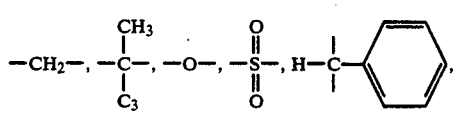

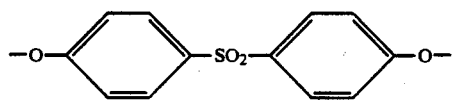

and X is a hydrogen atom, a methyl, ethyl or isopropyl radical, with (b) at least one p-allylaniline having the formula:

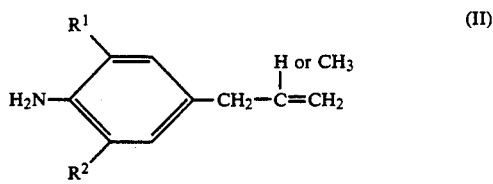

in which the groups R$^1$ and R$^2$, which may be identical or different, are each a C$_1$-C$_4$ alkyl radical.

2. The bisimido/allylaniline polymer as defined by claim 1 said comonomers (a) and (b) having been copolymerized in the presence of (c), an organic peroxide, azobisiobutyronitrile, or an imidazole of the formula:

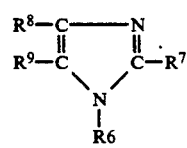

in which each of R$^6$, R$^7$, R$^8$, and R$^9$, which may be identical or different, is a hydrogen atom, an alkyl or alkoxy radical having from 1 to 20 carbon atoms, or a vinyl, phenyl or nitro radical, with the proviso that R$^8$ and R$^9$ and the carbon atoms from which they depend may together form a single ring member, and with the further proviso that R$_6$ may be a carbonyl group bonded to a second such imidazole.

3. The bisimido/allylaniline polymer as defined by claim 1, comprising the copolymerizate of said comonomers (a) and (b) in the presence of (d), a vinylpyridine, N-vinylpyrrolidone, allyl isocyanurate, vinyltetrahydrofuran, or mixture thereof.

4. The bisimido/allylaniline polymer as defined by claim 1, wherein the ratio of the number of moles of comonomer (a) to the number of moles of NH$^2$ groups comprising the comonomer (b) ranges from 20 to 0.1.

5. The bisimido/allylaniline polymer as defined by claim 4, said ratio ranging from 5 to 0.5.

6. The bisimido/allylaniline polymer as defined by claim 2, wherein the amount of compounds (c) present ranges from 0.01% to 6% by weight of the total weight of said comonomers (a) and (b).

7. The bisimido/allylaniline polymer as defined by claim 3, wherein the amount of compound (d) present is less than 50% by weight of the total weight of said comonomers (a) and (b).

8. The bisimido/allylaniline polymer as defined by claim 7, such amount of compound (d) ranging from 1% to 25% by weight of the total weight of said comonomers (a) and (b).

9. The bisimido/allylaniline polymer as defined by claim 1, comprising the copolymerizate of said comonomers (a) and (b) in the presence of at least one diprimary diamine (e) selected from among:

(i) a diamine having the formula:

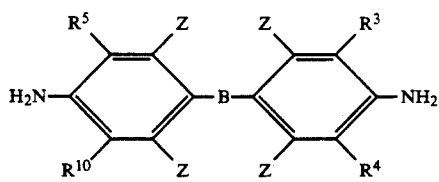 (IV)

in which each of the symbols $R^5$, $R^{10}$, $R^3$, and $R^4$, which may be identical or different, is a methyl, ethyl, propyl or isopropyl radical, each of the symbols Z, which may be identical or different, is a hydrogen atom or a chlorine atom, and the symbol B is —CH₂—,

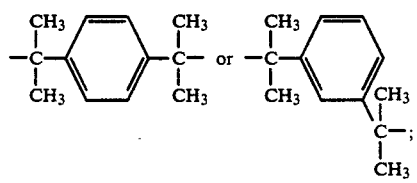

(ii) a diamine having the formula:

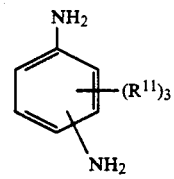 (III)

in which the amino radicals are in a meta- or para-position relative to each other, and each of the symbols $R^{11}$, which may be identical or different, is a methyl, ethyl, propyl or isopropyl radical; and (iii) at least one guanamine of the formula:

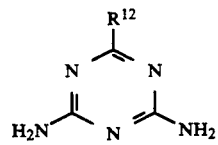 (V)

in which the symbol $R^{12}$ is a linear or branched alkyl radical having from 1 to 12 carbon atoms, an alkoxy radical having from 1 to 12 carbon atoms, a phenyl radical optionally substituted by 1 to 3 alkyl radicals having from 1 to 3 carbon atoms in the alkyl moiety thereof and in which the benzene ring may optionally be substituted by 1 to 3 alkyl radicals having from 1 to 3 carbon atoms.

10. The bisimido/allylaniline polymer as defined by claim 1, comprising the copolymerizate of said comonomers (a) and (b) in the presence of at least one compound (f) selected from among:

(f1) a chlorinated or brominated epoxy resin;
(f2) an N,N'-alkylenebistetrahalophthalimide of the formula:

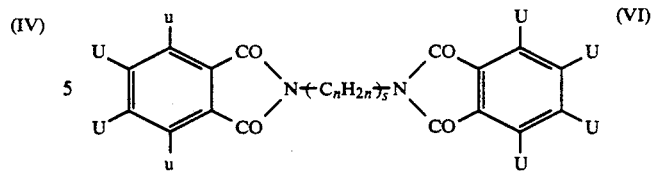 (VI)

in which each of the symbols U, which may be identical or different, is a chlorine or bromine atom, the alkylene racial —$C_nH_{2n}$— may be linear or branched, n is an integer equal to 1, 2, 3 or 4, and S is 0 or 1;

(f3) a halogenated compound of the formula:

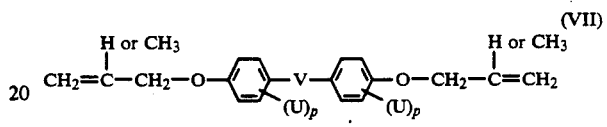 (VII)

in which the symbols U are as defined above, the symbol V is a single valence bond, a linear or branched alkylene racial —$C_nH_{2n}$—, with n being equal to 1, 2, 3 or 4, or an oxygen atom, and p is an integer equal to 2, 3 or 4;

(f4) an unhalogenated epoxy resin;
(f5) an alkenylphenol of the formula:

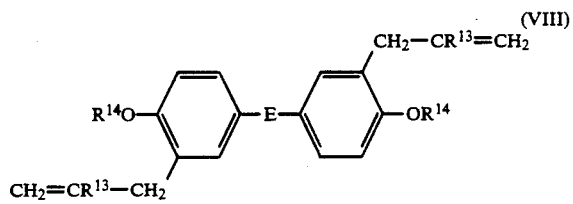 (VIII)

in which the symbol E is a single valence bond or one of the divalent radicals:

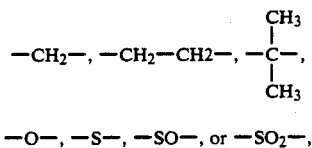

—O—, —S—, —SO—, or —SO₂—, each of the symbols $R^{13}$, which may be identical of different, is a hydrogen atom or a methyl radical and each of the symbols $R^{14}$, which may be identical or different, is a hydrogen atom or a linear or branched alkyl radical having from 1 to 6 carbon atoms, or a phenyl radical; and (f6) an acrylate of the formula:

$$(CH_2=CR^{15}—CO—O)_n—B \qquad (IX)$$

in which the symbol $R^{15}$ is a hydrogen atom or a methyl radical, n is a whole or fractional number equal to at least 1 and not exceeding 8, the symbol B is an organic radical of valency n, derived from a linear or branched saturated aliphatic residue containing from 1 to 30 carbon atoms and optionally containing one or more oxygen bridges and/or one or more free hydroxyl functional groups, or from an aryl or arylaliphatic residue having from 6 to 150 carbon atoms, which comprises a benzene nucleus which may be substituted by one to three alkyl radicals having from 1 to 5 carbon atoms, or of a plurality of benzene rings optionally substituted as indicated above and bonded together by a single valence bond, an inert moiety or an alkylene radical having from 1 to 3 carbon atoms, with the proviso that such aromatic residue may contain one or more oxygen bridges and/or one or more free hydroxyl functional groups, and with the further proviso that the free valencies of said aromatic radical B may be borne by a carbon atom of an aliphatic chain and/or by a carbon atom of a benzene nucleus.

11. The bisimido/allylaniline polymer as defined by claim 1, comprising the copolymerizate of said comonomers (a) and (b) in the presence of an N,N'-bismaleimide compound (g) which comprises a diorganopolysiloxane structural unit.

12. The bisimido/allylaniline polymer as defined by claim 11, said diorganopolysiloxane N,N'-bismaleimide having the formula:

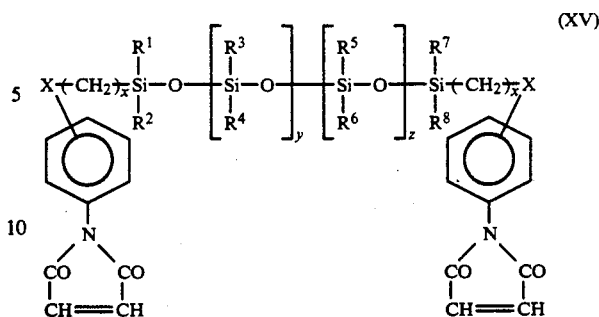

in which X, which is in the ortho-, meta- or para-position relative to the carbon atom of the benzene ring which is bonded to nitrogen, is a single valence bond or one of the following atoms or groups:

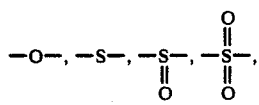

each of $R^1$, $R^2$, $R^3$, $R^4$, $R^5$, $R^6$, $R^7$ and $R^8$, which may be identical or different, is a linear or branched alkyl radicals having from 1 to 12 carbon atoms, or a substituted such radical bearing one or more chlorine, bromine or fluorine atom or —CN group substituents, or a phenyl radical optionally substituted by one or more alkyl and/or alkoxy radicals having from 1 to 4 carbon atoms or by one or more chlorine atoms; the symbol x is an integer ranging from 2 to 8; and the symbols y and z are identical or different, whole or fractional numbers, the sum of which ranges from 0 to 100.

13. The bisimido/allylaniline polymer as defined by claim 1, crosslinked and insoluble and exhibiting essentially no softening at a temperature below the degradation temperature thereof.

14. The bisimido/allylaniline polymer as defined by claim 1, in heat-curable prepolymeric state, soluble in polar organic solvents and exhibiting a softening point at a temperature less than 200° C.

15. A shaped article comprising the bisimido/allylaniline polymer as defined by claim 1.

16. A shaped article comprising the bisimido/allylaniline insoluble polymer as defined by claim 13.

17. A shaped article comprising the bisimido/allylaniline prepolymer as defined by claim 14.

* * * * *